United States Patent [19]
Lundgren

[11] 3,786,540
[45] Jan. 22, 1974

[54] CUTTING INSERT
[75] Inventor: Evert Gustav Lundgren, Sandviken, Sweden
[73] Assignee: Sandvikens Jernverks Aktiebolag, Sandviken, Sweden
[22] Filed: Oct. 17, 1972
[21] Appl. No.: 298,234

[30]  Foreign Application Priority Data
     Oct. 27, 1971  Sweden.............................. 13607/71

[52] U.S. Cl. .................................................. 29/95
[51] Int. Cl.............................................. B26d 1/00
[58] Field of Search ..................... 29/95, 96, 97, 98

[56]          References Cited
              UNITED STATES PATENTS
3,399,442  9/1968  Jones et al. .............................. 29/95
3,383,748  5/1968  Galimberti et al. ...................... 29/95
1,838,520  12/1931 Archer..................................... 29/98

*Primary Examiner*—Harrison L. Hinson
*Attorney, Agent, or Firm*—Pierce, Scheffler & Parker

[57]          ABSTRACT

A cutting insert for use in the chip-forming machining of a metal work piece has at least one insert corner with one or more associated cutting edges provided with chip-breakers in the form of grooves in the broad sides of the cutting insert. According to the invention, the cutting edge is so formed that in the plane of the clearance or side face it describes a curve consisting of inward- or downward- directed parts from the insert corners and an interjacent outward- or upward turned part.

7 Claims, 7 Drawing Figures

PATENTED JAN 22 1974 3,786,540
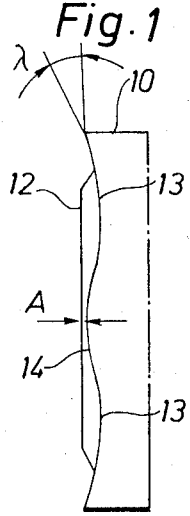
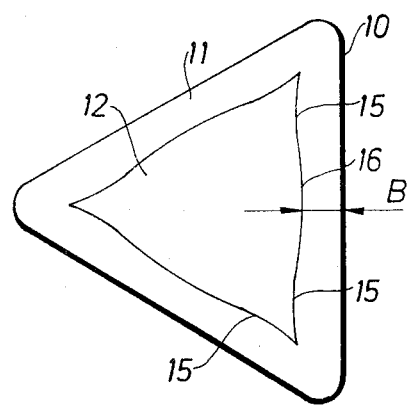
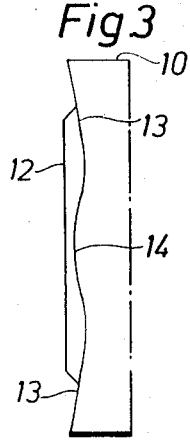
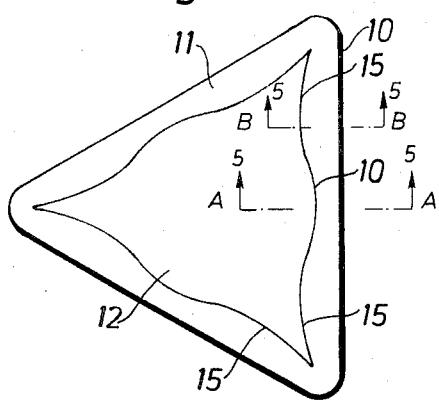
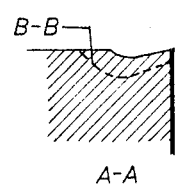
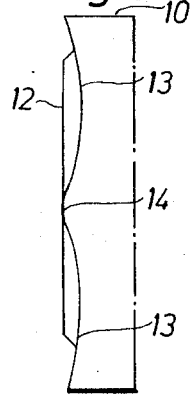
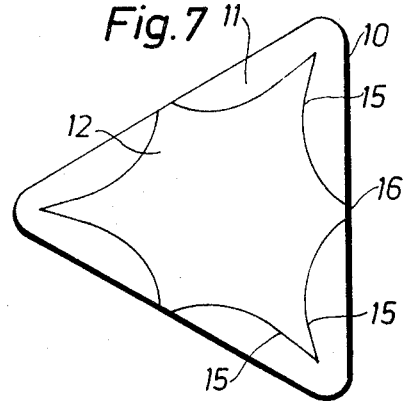

CUTTING INSERT

The present invention relates to a cutting insert for the chip-forming machining of metal work-pieces.

Negative, respectively positive, plane indexable cutting inserts give negative, respectively positive, cutting angles. In cutting inserts having sintered chip-breakers used in negative tool-holders and having so-called negative basic form, it is possible to obtain positive top rake by suitable shaping of the cutting edge and its associated chip-breaker. These cutting inserts, however, have normally negative front to back rake.

It heretofore had been thought possible to obtain positive front to back rake by shaping the cutting edge in the form of an arc. In known embodiments according to this latter principle, the depth of the chip-breaker increased successively and was greatest at the middle of the insert. This form gave a very hard and unfavorable chip-breaking. The described shape of the chip-breaker meant, also, that its width increased successively and was largest at the middle of the insert.

In double-faced cutting inserts with sintered chip-breaker, the chip-breaker reduces the size of the base or support face, and it gives the insert an overhang which reduces the strength of the cutting edge. Because of the same reason the insert may tip, thereby bringing the under-lying cutting-edge into contact with the support and break. Therefore, the chip-breaker cannot be formed with arbitrary width, but its shaping must be a compromise between its function of chip-breaking and the support of the base face. In the earlier-mentioned known embodiment, the relatively large width of the chip-breaker, particularly at the middle of the insert, caused considerable drawbacks and risks during the cutting operation.

According to the present invention there is provided a cutting insert which in a favorable way solves many prior problems concerning chip-breaking and simultaneous supporting of the insert. At the same time, demands upon positive front to back rake can be fulfilled or maintained.

The invention will be better understood from the following specification taken in connection with the appended drawing, in which:

FIG. 1 is a side elevational view of the insert in FIG. 2;

FIG. 2 is a horizontal projection view of a cutting insert according to the invention, showing the top side of the same;

FIG. 3 is a side elevational view of the insert in FIG. 4;

FIG. 4 is a horizontal projection view of another embodiment of the cutting insert according to the invention;

FIG. 5 shows examples of profiles of chip-breakers.

FIG. 6 is a side elevational view of the insert in FIG. 7; and

FIG. 7 is a horizontal projection view of a third embodiment of cutting insert according to the invention.

The cutting inserts 10 shown in FIGS. 1–7 have on one broad side (and alternatively and preferably also on the opposite side) three insert corners and interjacent cutting edges. Along the cutting edges there are chip-breakers in the form of grooves 11 surrounding a central support face 12 of the cutting insert. The cutting edge is so formed that in the plane of the clearance or side face it describes a curve composed of inwardly- or downward- directed parts 13, counted from the insert corners, and an interjacent outward- or upward-turned part 14. Furthermore, the chip-breaker 11 is so formed that in the plane of the chip-face or broad-side it describes a curve on the support face 12, the principal form of said curve being essentially the same as the form of the corresponding cutting edge. Thus, the curve has, from the insert corners, inward-directed parts 15 in relation to the insert edge and an interjacent outward-turned part 16.

By the shaping shown, the cutting edge still obtains a positive front to back rake λ (see FIG. 1) but it can be given desired depth A (see FIG. 1) at the middle. The interjacent out-turned part will also make the width B of the chip-breaker smallest at the middle (see FIG. 2) of the insert. By varying the form of the cutting edge and the chip-breaker it is possible to give the cutting insert an optimum form concerning chip-breaking and support.

In the embodiment shown in FIGS. 1 and 2, the cutting edge consists of two concave parts 13 and an interjacent convex part 14. The boundary of the chip-breaker on the support face 12 shows also corresponding concave parts 15 and a convex part 16.

FIGS. 3 and 4 show an embodiment in which the outer portion 13 of the cutting edge (and corresponding chip-breaker part 15) is straight shaped.

FIG. 5 shows two sections through the chip-breaker according to FIG. 4 one section at the middle of its length (5A–A), the other at its maximum width (5B–B). By varying the form of the chip-breaker, the depth of the cutting edge respectively width of the chip-breaker can become optimum in respect to chip-breaking respectively support of the cutting edge.

FIGS. 6 and 7 show an embodiment in which the width of the chip-breaker has been diminished to nothing at the middle of the insert, i.e. the insert has no chip-breaker at the middle part 16, respectively 14.

In all cases, the insert edge (cutting edge) per se can be sharp or rounded or provided with a primary face or land area ("edge strengthening").

I claim:

1. A cutting insert in the form of a regular polygon having parallel top and bottom faces and a peripheral surface extending between said faces, said peripheral surface comprising the sides of said regular polygon, sharp edges formed at the juncture of said faces and said sides, at least one of said faces having a chip controlling groove formed therein extending along and in contact with said edge, the width of said groove describing a compound curve such that the width varies along the length of said edge in such manner that the width of said groove at the midpoint of said edge is less than the width at points intermediate said midpoint and the ends of said edge.

2. A cutting insert according to claim 1 in which the level of the cutting edge is determined by the width of said groove whereby as said width increases, the level of said cutting edge is lowered with respect to said face of said insert.

3. A cutting insert according to claim 2 in which the juncture of said groove and said side forms a straight line in a plane parallel to said face.

4. A cutting insert according to claim 2 in which the juncture of said groove and said side describes a compound curve in the plane of said side.

5. A cutting insert according to claim 1 in which said chip controlling groove extends in a closed path around said one face.

6. A cutting insert according to claim 1 in which said chip controlling groove is discontinuous so that there are portions of said edge to which said groove does not extend.

7. A cutting insert according to claim 6 in which said portions of said edge to which said groove does not extend are in the vicinity of the midpoint of said edge.

* * * * *

UNITED STATES PATENT OFFICE
CERTIFICATE OF CORRECTION

Patent No. 3,786,540     Dated January 22, 1974

Inventor(s) Evert Gustav Lundgren

It is certified that error appears in the above-identified patent and that said Letters Patent are hereby corrected as shown below:

[73]  Assignee:  Sandvik Aktiebolag,
                 Sandviken, Sweden

Signed and sealed this 30th day of April 1974.

(SEAL)
Attest:

EDWARD M. FLETCHER, JR.          C. MARSHALL DANN
Attesting Officer                Commissioner of Patents